(12) United States Patent
Clauberg

(10) Patent No.: US 6,735,219 B1
(45) Date of Patent: May 11, 2004

(54) PACKET-PROCESSING APPARATUS AND PACKET SWITCH ADAPTER FOR THE PROCESSING OF VARIABLE-LENGTH PACKETS AND A METHOD THEREOF

(75) Inventor: Rolf Clauberg, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,456

(22) Filed: Sep. 17, 1999

(30) Foreign Application Priority Data

Oct. 9, 1998 (EP) .......................... 98117128

(51) Int. Cl.[7] .......................... H04L 12/54
(52) U.S. Cl. .......................... 370/474
(58) Field of Search .......................... 370/394, 395.42, 370/412, 413, 429, 470, 474, 400, 401, 402, 366, 384; 709/240

(56) References Cited

U.S. PATENT DOCUMENTS

| | | | | |
|---|---|---|---|---|
| 4,754,451 A | * | 6/1988 | Eng et al. ................ | 370/60 |
| 5,050,161 A | * | 9/1991 | Golestani ............... | 370/60 |
| 5,245,603 A | * | 9/1993 | Newman ................ | 370/54 |
| 5,497,371 A | * | 3/1996 | Ellis et al. .............. | 370/60 |
| 5,875,190 A | * | 2/1999 | Law ...................... | 370/395 |
| 6,067,301 A | * | 5/2000 | Aatresh ................. | 30/418 |

FOREIGN PATENT DOCUMENTS

| | | |
|---|---|---|
| EP | 0632625 A1 | 1/1995 |
| EP | 0684719 A1 | 11/1995 |
| EP | 0706297 A1 | 4/1996 |
| EP | 0855820 A2 | 7/1998 |

* cited by examiner

*Primary Examiner*—Steven H. D Nguyen
*Assistant Examiner*—Duc Duong
(74) *Attorney, Agent, or Firm*—Thomas A. Beck; Louis Herzberg (57) ABSTRACT

The present invention concerns a packet-processing apparatus and a packet switch adapter for the processing of variable-length packets comprising packet data and packet information. The adapter and/or the apparatus comprises a distributor for distributing the packets to several parallel, identical processing paths, each comprising at least one processing unit, whereto the packets are fed and which is able to process only for one of the packets its packet information at any moment in time. The feeding is interruptable for feeding a different of the packets to another of the processing paths. Furthermore, a packet-processing method for distributing received variable-length packets to several parallel, identical processing paths is disclosed.

5 Claims, 5 Drawing Sheets

PACKET-PROCESSING APPARATUS AND PACKET SWITCH ADAPTER FOR THE PROCESSING OF VARIABLE-LENGTH PACKETS AND A METHOD THEREOF

TECHNICAL FIELD

The present invention relates to systems, such as a packet-processing network for example, where information is transmitted by means of variable-length packet streams. It allows on-the-fly processing of packets up to very high data transmission rates.

BACKGROUND OF THE INVENTION

Packet-processing systems, like communication networks and storage systems, are getting more and more important. An advantage of this kind of packet-based systems is that each and any packet is autonomous and can be routed through a network, for example, just by making use of the information carried in the packet's header. Asynchronous transfer mode, hereinafter abbreviated to ATM, data transmission networks are well-known packet-processing systems, whereby a single processed packet has a fixed length and is called a cell. This ATM technology enables high-speed data transmission rates and supports many types of traffic, including data, facsimile, voice, video, and images, just to name some types encountered in a typical multimedia environment. The emergence of the Internet and related online technologies like teleconferencing, telemedicine, distance learning, HDTV, real-time collaboration must handle ever higher data rates. Therefore, the emphasis is on changing from switching systems for pure ATM cells to such systems supporting variable-length IP (Internet Protocol) packets in addition to ATM cells.

This patent application is related to WO 97/29613, entitled "Parallel on-the-fly Processing of Fixed Length Cells" filed on Feb. 6, 1996, presently assigned to the assignee of the instant application and the disclosure of which is incorporated herein by reference.

Typical devices for packet-processing systems of any kind are: hubs, routers, servers, switches, e.g. used for connection purposes, and adapter cards for linking computers or other devices such as printers, plotters, scanners, disk drives, fax machines, network sniffers, to a packet-processing system. The faster the packets are transmitted in such a packet-processing system, the more complex and expensive the packet-handling and -processing gets.

Some packet-processing systems have reached data transmission rates where the bounds of possibility are reached already or will be reached soon. There is a demand for new approaches to circumnavigate or solve this problem. Some networks operating in the Gigabit-per-second range have reached a stage where new solutions are needed.

It is thus an object of the present invention to provide a new concept for variable-length packet-processing even at very high data transmission rates.

It is a further object of the present invention to provide an apparatus and method enabling very fast on-the-fly processing of variable-length packets.

It is another object of the present invention to apply the approach to packet-processed systems.

It is still another object of the present invention to guarantee on-the-fly processing of variable-length packets with quality of service.

SUMMARY OF THE INVENTION

The present invention provides a packet-processing apparatus for processing an input packet stream of received variable-length packets. A variable-length packet, hereinafter simply called packet, comprises packet data and packet information, whereby the packet data is also referred to as payload, and the packet information, e.g. length, packet lifetime, header checksum, address, are usually provided in a header of the packet. A frame checksum, also referred to as FCS, can be provided at the end of an IP (Internet Protocol) packet. The packet-processing apparatus comprises a distributor for distributing the packets to several parallel and identical processing paths, whereby each path comprises at least one processing unit, whereto the packets are fed and which is able to process only for one of the packets its packet information at any moment in time. That means only one packet with packet information or in case that a packet has been interrupted into packet-parts, only one packet-part with packet information can be present for processing in one processing unit. The packet data or the packet-parts without packet information are processed by shifting them through the processing units.

The received packets may have different lengths and priorities. Further the number of clock cycles a specific unit in the processing path needs to perform its action can be larger than the length of the packet in terms of clock cycles. Hence, the next packet would arrive at this specific unit when the unit is still occupied with the previous packet. Therefore the feeding is interruptable for feeding a different of the packets to another of the parallel and identical processing paths. It is possible to interrupt the feeding of a long packet for feeding a shorter packet with a higher priority or to interrupt long packets alternately, e.g. for a well-balanced data throughput. The longer packets can be divided into several packet-parts if necessary. It is an advantage of the present invention that real-time traffic with variable-length packets can be achieved while guaranteeing on-the-fly processing of variable-length packets with quality of service, i.e. minimum delays occur during processing of variable-length packets and important packets can be processed faster.

The several packet-parts of one interrupted packet can be transmitted and processed in the same processing path through the corresponding units, which has the advantage that it is easier to collect and reassemble the packet-parts at the end of each respective processing path and because more packets can be in process during the same time. Further, it is known in which processing path and in which processing unit the packet-parts are present and it isn't thus necessary to look for the packet-parts in other processing paths.

A collector for each processing path for collecting the several packet-parts can be used at the end of each processing path, which has the advantage that the packet-parts can be collected and reassembled to the original packet before the packet is multiplexed and/or the presence of errors may be detected. The collector has preferably a buffer. Only one collector for collecting and reassembling the packet-parts from all processing paths can be applied with the advantage that chip area can be saved, collectors can be combined, resources can be shared and only one unit for collecting and reassembling is necessary.

When for each interrupted packet, information data is created, which can be an additional bit, signalizing that a packet has been interrupted, then the advantage occurs that every interrupted packet, which is divided into packet-parts, can be recognized from each processing unit, whereby for example payload can be processed faster by shifting it through the respective processing unit and no waiting for a following packet or packet-part is necessary. The collection of packet-parts at the end of the processing path using the information data allows to complete then the packet-parts back to the original packet. The additional bit can be implemented easily which is described below.

When the processing in the processing unit is operated with a predetermined clock, and the time period between two subsequently processed packets is an integer multiple of its clock cycle duration, then the advantage occurs that the processing can be carried out in a synchronized manner. Further, the clock cycles are determined and the process of the packets can be calculated in advance.

If a sorter for sorting the received packets according to their priority into priority queues is used, then the advantage occurs that a sequential packet stream is split up into several sub-streams and a fast access to the sorted packets according to their priorities is achievable.

When a selector for choosing packets from the priority queues is used, then the advantage occurs that a selection according to the priorities of the packets for further processing can be achieved and the respective selection of the packets can be carried out in an accelerated mode.

When a distributor for distributing of the packets to several parallel, identical processing paths is used, then the advantage occurs that the packets can be distributed according to the process in a non-occupied processing unit or processing path, whereby a parallel processing is possible and therefore the entire processing system becomes faster.

A packet switch adapter for the processing of variable-length packets is further disclosed. The variable-length packets comprising packet data and packet information are received as a sequential stream. The adapter comprises a distributor for distributing the packets to several parallel, identical processing paths, each comprising at least one processing unit, whereto the packets are fed and which is able to process only for one of the packets its packet information at any moment in time. The feeding is interruptable for feeding a different of the packets to another of the processing paths. This will be advantageous for the processing of long packets and therefore for real-time traffic, because long packets or packets with a low priority can be divided into packet-parts when a packet with a higher priority arrives and is processed immediately in another of the processing paths. The adapter comprises further a signalizer for signalizing that a packet has been interrupted into several packet-parts, whereby for each interrupted packet, information data is created. Furthermore, the adapter comprises a collector for collecting the several packet-parts and for reassembling thereof.

If a connection-label-lookup unit is employed to compare a field of a packet with fields of a predefined lookup table and in the case of match, the corresponding content from the lookup table is added to the packet, then the advantage occurs that a further unit is informed and realizes what to do with the packet.

If a header-error-correction unit for analyzing a packet header of the packets for one or more bit-errors is applied, then the advantage occurs that the errors can be realized and corrected and the packet can be processed in the right way.

If an operation, administration and maintenance packet-processing unit is applied for extracting from and/or inserting into the stream of packets at least one additional packet, then the advantage occurs that the stream of packets can be influenced and controlled by this unit. That means links and/or network-states can be checked.

If a packet-accounting unit for counting the number of packets forwarded to a connection and/or the number of occurring invalid packets is applied, then the advantage occurs that the total number of packets forwarded for a connection and possible invalid packets are recognized and the further processing can be adapted.

If a packet-policing unit for controlling a packet peak rate and/or medium rate is applied, then the advantage occurs that a feasible high packet throughput can be achieved by checking if the packet peak rate is conform to the permission granted for a connection, whereby invalid or useless packets can be eliminated.

If a switch-routing-header-insertion unit for adding to each packet a switch-specific header is applied, then the advantage occurs that a following switch realizes whereto to forward the respective packet.

The present invention further describes a packet-processing method for distributing received variable-length packets comprising packet data and packet information to several parallel, identical processing paths by feeding of the packets into paths. Each path comprises at least one processing unit which is able to process only for one of the packets its packet information at any moment in time. In the case of a first packet, which is a long packet and/or has a lower priority than a subsequent second packet, the feeding of the first packet is interrupted for feeding the second packet to another of the processing paths.

At the beginning, the received packets can be sorted according to their priority into priority queues. Several packet-parts of one interrupted packet can be processed in the same processing path and at the end of each processing path, the several packet-parts are collected and reassembled before the packets are brought through multiplexing into preferably one output packet stream. For each interrupted packet, information data is created, signaling that this packet has been interrupted.

DESCRIPTION OF THE DRAWINGS

The invention is described in detail below with reference to the following schematic drawings.

GENERAL DESCRIPTION

The present invention enables data transmission rates of tens of Gb/s with technical feasible clock cycle times while also guaranteeing quality of service for real-time traffic. Therefore, the present invention uses several virtual data paths for on-the-fly processing of variable-length packets. It is, however, to be understood that the concept can be used for any other kind of packet-based data system as will be indicated later. Since the conventional, sequential packet-by-packet processing has turned out not to be suited for high-speed data transmission systems, a new approach is proposed. The basic concept of the present invention together with preferred embodiments are described in the following with reference to FIGS. 1 to 7, wherein the same elements and units are referenced with the same numbering.

Figure 1A:
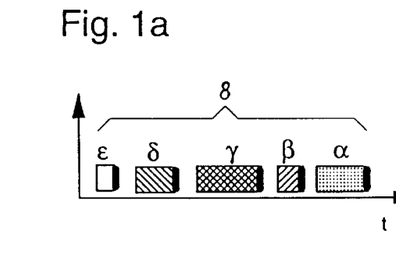
FIG. 1a shows a stream of variable-length packets.

In FIG. 1a, a typical data stream 8 of variable-length packets α, β, γ, δ, ε, each comprising packet data, also referred to as payload, and an in full-black depicted header which provides packet information, is illustrated. A data-processing system typically operates with a predetermined or adjustable clock. The packet stream 8 is depicted over a time axis t, whereby the packets α, β, γ, δ, ε come in one after the other. The packet stream 8 of variable-length packets α, β, γ, δ, ε consists of a first packet α, a second packet β, a third packet γ, a fourth packet δ and a fifth packet ε. In the following, the variable-length packets α, β, γ, δ, ε, referred to as packets, will be fed through a parallel processing apparatus 40, illustrated in FIG. 2b. Snapshots of packets and packet-parts have been taken at several times, illustrated in the FIGS. 1b to 5.

Figure 1B:
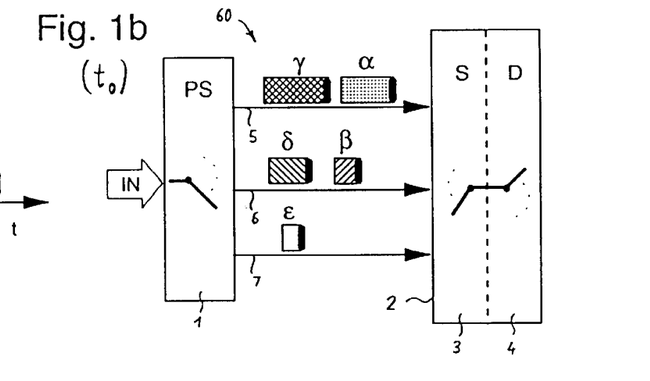
FIG. 1b is a schematic illustration of receiving variable-length packets in different queues with a sorter and a distributor.

FIG. 1b shows a schematic illustration of an input unit 60 with the arriving variable-length packets α, β, γ, δ, ε in different queues at a moment $t_0$ in time. The packets α, β, γ, δ, ε according to FIG. 1a are received with a not depicted receptor from an input medium. The FIG. 1b shows an arrow IN which indicates the variable-length packet stream coming from the receptor. A sorter 1, also referred to as priority sorter 1, is connected to a first queue 5, a second queue 6 and a third queue 7. These queues 5, 6, 7 are arranged in parallel and lead to a selector 3 which is coupled to a distributor 4. The selector 3 and the distributor 4 together form a choosing unit 2. The sorter 1 sorts the arriving variable-length packets α, β, γ, δ, ε according to their priority into the respective queues 5, 6, 7. Here, the packets α, β, γ, δ, ε have three different kinds of priorities which indicates the importance of the packets α, β, γ, δ, ε. The first packet α and the third packet γ have a low priority, whereas the second packet β and the fourth packet δ have a middle priority and the fifth packet ε has a high priority, therefore also referred to as high-priority packet ε. When the high-priority packet ε arrives, its processing should start immediately. In general, the priority of a packet is any kind of information which is available about the importance of the packet. This information can be stored in and delivered with the header of the packet. The priority of the packet can be determined according to its length, origin or lifetime which are further criteria or examples for fast processing of this packet. As mentioned, the sorter 1 is connected to the queues 5, 6, 7, whereby the packets α, β, γ, δ, ε are sorted. The first packet α and the third packet γ with low priority are sorted into the first queue 5, which hence serves for the low-priority packets α, γ. The second packet β and the fourth packet δ with middle priority are sorted into the second queue 6. The third queue 7 serves for packets with high priority, like the fifth packet ε. The queues 5, 6, 7 may be dedicated to real-time traffic support with variable-length packets and/or fixed-length packets, as well as to unrestricted packet-lengths for non-real-time traffic. One of the functions of a packet-processing apparatus, also referred to as a switch adapter or switch adapter card, is to concentrate the traffic into a single data stream or so many data streams as different priority queues 5, 6, 7 will be handled by an attached switch.

Figure 2A:
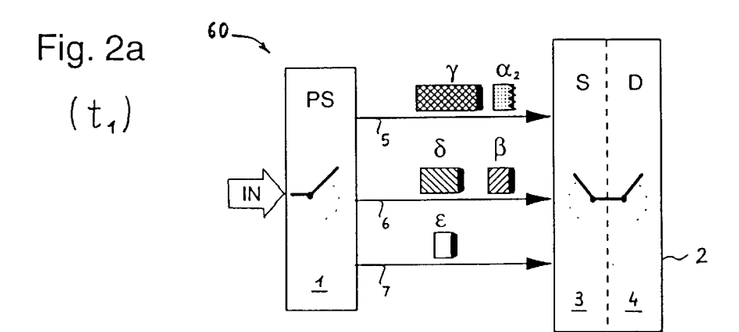
FIG. 2a is a schematic illustration according to FIG. 1b, whereby a first packet is divided and the rest of this packet is still in the queue.

FIG. 2a shows the input unit 60 according to FIG. 1b at a moment $t_1$. The first in-time received packet α is divided into two packet-parts, a first leading-packet-part $α_1$ and a first trailing-packet-part $α_2$, whereby the first leading-packet-part $α_1$ is fed to a following processing path 10, depicted in FIG. 2b. The first trailing-packet-part $α_2$ remains in the first queue 5, which is depicted by a serrated line. The reason for the division is that the second packet β with a higher priority than the first packet α is received and should be processed faster. The first trailing-packet-part $α_2$ is followed by the third packet γ in the first queue 5. The fourth packet δ is arriving in the second queue 6 and the high-priority packet, the fifth packet ε is arriving in the third queue 7, which have been sorted into the queues 5, 6, 7 by the priority sorter 1 respectively.

Figure 2B:
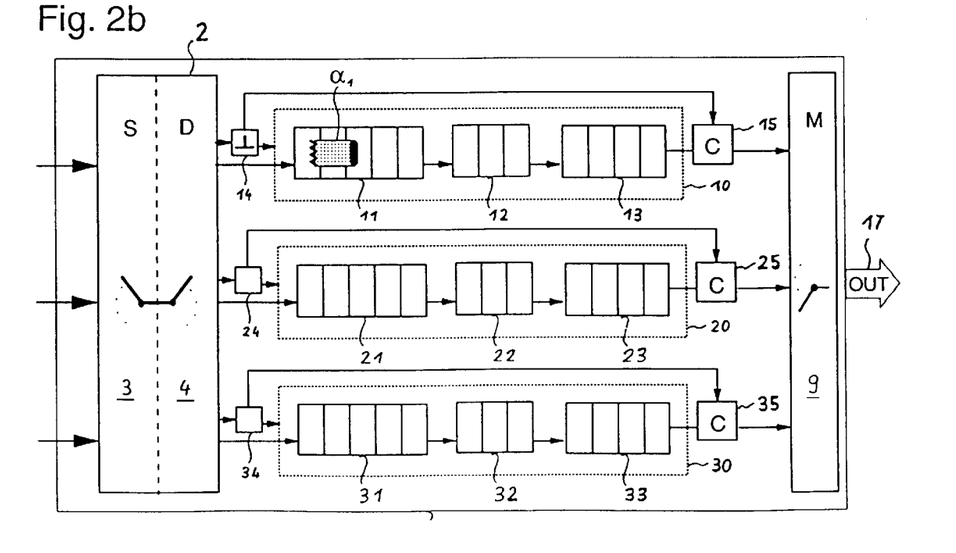
FIG. 2b is a first schematic snapshot of a parallel packet-processing apparatus with three parallel processing paths used to illustrate the routing and processing of packets.

FIG. 2b shows a first snapshot, which is taken also at the moment $t_1$ of a packet-processing apparatus 40. A part of the input unit 60 from FIGS. 1b and 2a is depicted with selector 3 and distributor 4 in FIG. 2b at the input side of the packet-processing apparatus 40. The selector 3 selects the packets α, β, γ, δ, ε from the priority queues 5, 6, 7 according to their priority and their arrival time, i.e. the selection is carried out in the following order: the first packet α with low priority; the second packet β with middle priority whereby the first packet α is interrupted; the third packet γ with low priority; the fourth packet δ with middle priority whereby the third packet γ is interrupted; the fifth packet ε with high priority whereby the fourth packet δ is interrupted. The distributor 4, distributes and puts the selected packets α, β, γ, δ, ε according to the load and/or the processing of the packets in a following processing path 10, 20, 30. In general, the number of clock cycles which a processing unit 11–13, 21–23, 31–33 in the processing path 10, 20, 30 needs to perform its action, can be larger than the length of the packet α, β, γ, δ, ε in terms of clock cycles. Hence, the next packet α, β, γ, δ, ε would arrive at this specific processing unit when the processing unit 11–13, 21–23, 31–33 is still occupied with the previous packet. Therefore the following packet should be sent to a parallel unit in a parallel path for processing. This task is managed by the distributor 4, which distributes the packets α, β, γ, δ, ε onto the processing paths 10, 20, 30. The distributor 4 can be a demultiplexer, which is supplied with information about the state of the process of the packets α, β, γ, δ, ε in the following processing paths 10, 20, 30.

The distributor 4 of the choosing unit 2 is connected to a first processing path 10. This first processing path 10 includes a first pre-processing unit 11 which precedes a first main-processing unit 12 which is connected to a first post-processing unit 13. The first processing units 11, 12 and 13 are hence arranged in a row and provide the first processing path 10. The last processing unit, here the first post-processing unit 13, is connected via a first collector 15 to a multiplexer 9 which provides an output 17. Further, a first signalizer 14 is coupled between the choosing unit 2 and the first processing path 10. This first signalizer 14 has also a connection to the first collector 15. The structure and the functionality of the three processing paths 10, 20, 30 is equivalent. A second processing path 20 comprises a second pre-processing unit 21, a second main-processing unit 22 and a second post-processing unit 23. A second signalizer 24 is arranged and connected between the choosing unit 2 and the second processing path 20. A second collector 25 connects the second processing path 20 with the multiplexer 9, whereby the second signalizer 24 has a connection to the second collector 25. A third processing path 30 includes a third pre-processing unit 31, a third main-processing unit 32 and a third post-processing unit 33. A third signalizer 34 is situated between the choosing unit 2 and the third pre-processing unit 31. A third collector 35 connects the third processing path 30 to the multiplexer 9, whereby the third signalizer 34 has a connection to the third collector 35. The embodiment of the packet-processing apparatus 40 comprises three parallel, identical processing paths 10, 20, 30 with corresponding signalizers 14, 24, 34 and collectors 15, 25, 35. The signalizers 14, 24, 34 create information data for each interrupted packet $\alpha$, $\beta$, $\delta$ respectively. This 'interrupt' information from the signalizers 14, 24, 34 goes to the corresponding processing path 10, 20, 30 and therewith to each processing unit 11–13 , 21–23 , 31–33 within the processing path 10, 20, 30 and to the corresponding collector 15, 25, 35. One possibility to provide the 'interrupt' information is to increase the bit-width by one bit and set to '1' for full or uninterrupted packets and '0' for interrupted packets.

As mentioned above, the distributor 4 has distributed the first leading-packet-part $\alpha_1$ to the first pre-processing unit 11 within the first processing path 10. Because in the meantime the second packet $\beta$ with a higher priority than the first packet $\alpha$ was received, the first packet $\alpha$ has been divided into the first leading-packet-part $\alpha_1$ and the first trailing-packet-part $\alpha_2$ in order to process the second packet $\beta$ to guarantee for real-time traffic which is described in detail in conjunction with FIG. 3b. Since the first packet $\alpha$ is divided, the first signalizer 14 corresponding to the first processing path 10 realizes the fact and signalizes that the first packet $\alpha$ has been interrupted, whereby for the interrupted first packet $\alpha$, that means for the first leading-packet-part $\alpha_1$, therewith information data is created which is provided to the first processing path 10 and to the first collector 15 for collecting the first packet-parts $\alpha_1$, $\alpha_2$ and reassembling of the first packet $\alpha$. Therefor a buffer in the first collector 15 for collecting the first packet-parts $\alpha_1$, $\alpha_2$ of the interrupted packets might be useful. The information data might be realized in form of an additional bit which either can be provided separately or added to the information of the packet. Any other approach for signalizing that a packet has been interrupted can be used instead.

According to the invention in general, the incoming, received and sorted packet stream of variable-length packets 8 is fed into a parallel processing path of the packet-processing apparatus 40 where it is demultiplexed into N sub-streams or virtual processing paths of variable-length packets, with N=2, 3, . . . The demultiplexing is done without corrupting the packets content. The number N depends on the data transmission rate or data throughput, the number of priorities, the number of cycles the subsequent processing will take, the length of the packets and other parameters. The higher the data throughput is, the more N sub-streams or virtual processing paths are necessary. In the present example, the choosing unit 2 with the distributor 4 splits the variable-length packet stream 8 into three sub-streams, i.e. N=3. These three sub-streams are then provided at the N output ports of the distributor 4 and fed into the N identical, parallel processing paths 10, 20, 30. Each processing path 10, 20, 30 comprises here three processing units 11–13 ; 21–23 ; 31–33 , whereby some examples for the functionality of the processing units are described in conjunction with FIG. 7. The processing of the variable-length packets $\alpha$, $\beta$, $\gamma$, $\delta$, $\epsilon$ through the parallel processing paths 10, 20, 30 will be elaborated in connection with FIGS. 3a to 5. The sub-streams—after having been processed—are fed into a multiplexer 9 which is employed to provide an output stream 17 of the variable-length packets $\alpha$, $\beta$, $\gamma$, $\delta$, $\epsilon$. This multiplexer 9 is designed such that a sequence of the packets $\alpha$, $\beta$, $\gamma$, $\delta$, $\epsilon$, i.e. the chronological order on the input medium IN, is reestablishable or a sequence of the packets $\beta$, $\alpha$, $\epsilon$, $\delta$, $\gamma$ according to their priorities and processing is achievable. That means that some packets $\alpha$, $\gamma$, $\delta$ can be passed by by other packets $\beta$, $\delta$, $\epsilon$ because of higher priorities, but the order is maintained for those packets $\alpha$ and $\gamma$, $\beta$ and $\delta$, $\epsilon$ coming from the same priority queue 5, 6, 7.

Figure 3A:
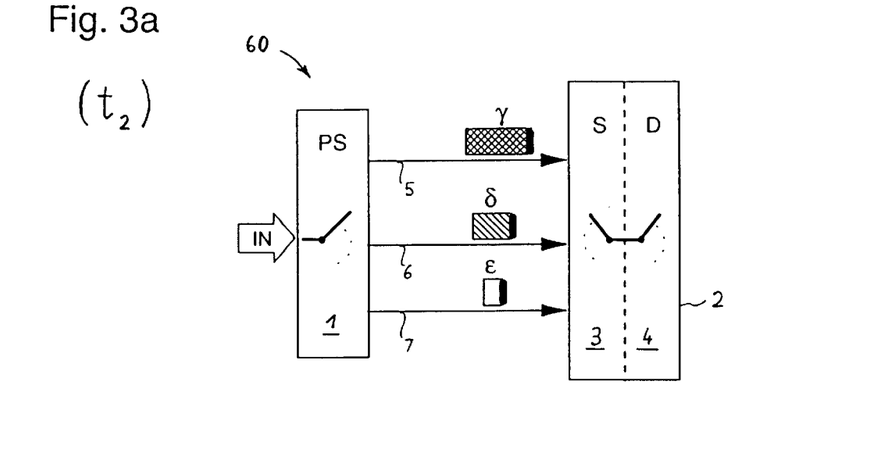
FIG. 3a is a schematic illustration according to FIG. 1b and 2a, whereby three packets remain in different queues.
Figure 3B:
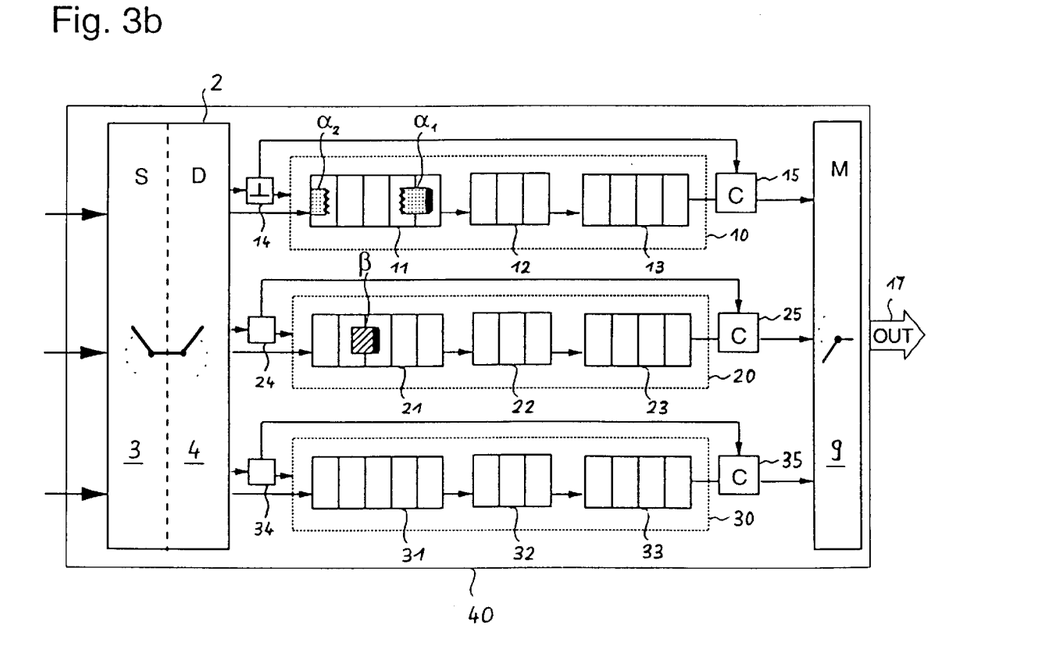
FIG. 3b is a second schematic snapshot according to FIG. 2b with packets in two different paths.

FIG. 3a shows the input unit 60 according to FIG. 1b and 2a at a moment $t_2$, wherein the three packets $\gamma$, $\delta$, $\epsilon$ remain in the queues 5, 6, 7. The first packet $\alpha$ and the second packet $\beta$ are in process which is illustrated in FIG. 3b. The third packet $\gamma$, the fourth packet $\delta$ and the fifth packet $\epsilon$ have been sorted in corresponding priority queues 5, 6, 7, whereby the third packet $\gamma$ is stored in the first queue 5 and is waiting for its processing, the fourth packet $\delta$ is arriving in the second queue 6 and the high-priority packet $\epsilon$ is arriving in the third queue 7.

FIG. 3b shows a second snapshot, which is taken also at the moment $t_2$ of the packet-processing apparatus 40 according to FIG. 2b with the same structure. Because the second packet $\beta$ was received, the first packet $\alpha$ has been divided into the first leading-packet-part $\alpha_1$ and the first trailing-packet-part $\alpha_2$ in order to process the second packet $\beta$ to guarantee for real-time traffic.

That means in general, if a long packet, like the first packet $\alpha$, is processed and a packet with a higher priority, like the second packet $\beta$, arrives in one of the other queues 6, 7 during processing of the first packet $\alpha$ in the processing path 10, the feeding is irrupted, to allow feeding the short packet, here the second packet $\beta$, to one of the non-occupied parallel processing paths 20, 30, here second processing path 20. After this, feeding of the long first packet $\alpha$ continues on the first processing path 10 where the feeding started for at least the number of clock cycles which correspond either to the maximum packet-length allowed for real-time traffic or to the end of the long first packet $\alpha$. If further short, high-priority packets arrive during feeding of the long first packet $\alpha$, this feeding can be interrupted every Nm clock cycles where Nm is the number of clock cycles corresponding to processing the maximum packet-length allowed for real-time traffic. The total situation in this case is feeding of the higher priority packets $\beta$, $\delta$, $\epsilon$ on N-1 parallel virtual processing paths 20, 30 and feeding of the low priority packets $\alpha$, $\gamma$ on the one occupied processing path. That means in general, that a higher priority packet $\beta$, $\delta$, $\epsilon$ which interrupts a lower priority packet $\alpha$, $\gamma$, $\delta$ is fed to another non-occupied processing path 20, 30. To ensure correct processing in this situation, a reservation mechanism may be established which reserves the processing path 10 on which the low priority packet $\alpha$ starts, for this packet $\alpha$ while allowing to distribute the higher priority packets $\beta$, $\delta$, $\epsilon$ on the non-occupied processing paths 20, 30. In addition, an information may be added to the low priority packets $\alpha$, $\gamma$ whether specific packet-parts are actual data or just empty bytes caused by interruption of the processing for the low priority packets $\alpha$, $\gamma$. This information could be added, e.g. as an additional data bit with value of e.g. '1' for actual data and value '0' during interruption. In this implementation each of the parallel processing paths 10, 20, 30 would increase by one bit bit-width.

The first signalizer 14 realizes the interruption of the first packet α and signalizes this, whereby for the interrupted first packet α, that means for the first leading-packet-part $α_1$, information data is created which here is provided to the first processing path 10 and to the first collector 15 at the end of the first processing path 10. Also other approaches for signalizing and recognition of interrupted packets could be applied.

The first leading-packet-part $α_1$ is still in process in the first pre-processing unit 11, whereby the second packet β is in process in the second pre-processing unit 21 and the first leading-packet-part $α_1$ follows the first trailing-packet-part $α_2$ in the same path which is the first processing path 10.

Figure 4A:
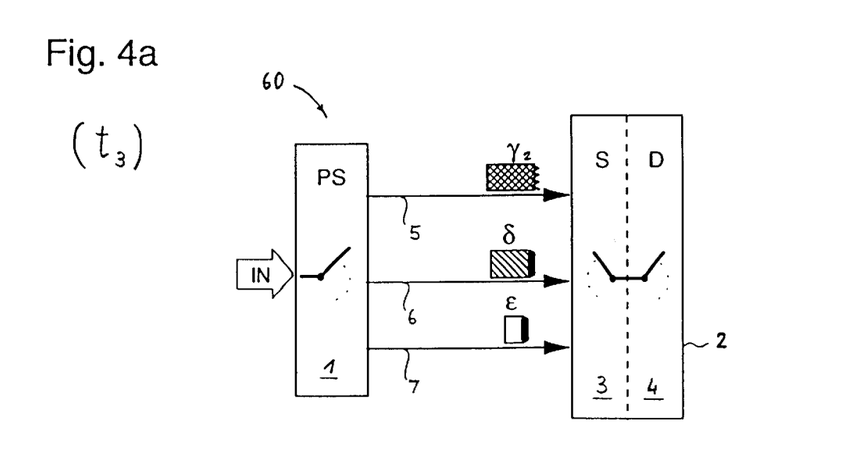
FIG. 4a is a schematic illustration according to the FIGS. 1b, 2a and 3b whereby another packet is divided and a packet-part remains in the queue.

FIG. 4a shows the input unit 60 according to the FIGS. 1b, 2a and 3a at a moment $t_3$. The third packet γ, the fourth packet δ and the fifth packet ε have been sorted in their corresponding priority queues 5, 6, 7. The fourth packet δ was received in the second queue 6 and is waiting for its processing. That's why the third packet γ is interrupted and divided into a third leading-packet-part $γ_1$ and a third trailing-packet-part $γ_2$, whereby the third trailing-packet-part $γ_2$ is waiting in the first queue 5 for its further processing. The high-priority fifth packet ε is arriving in the third queue 7.

Figure 4B:
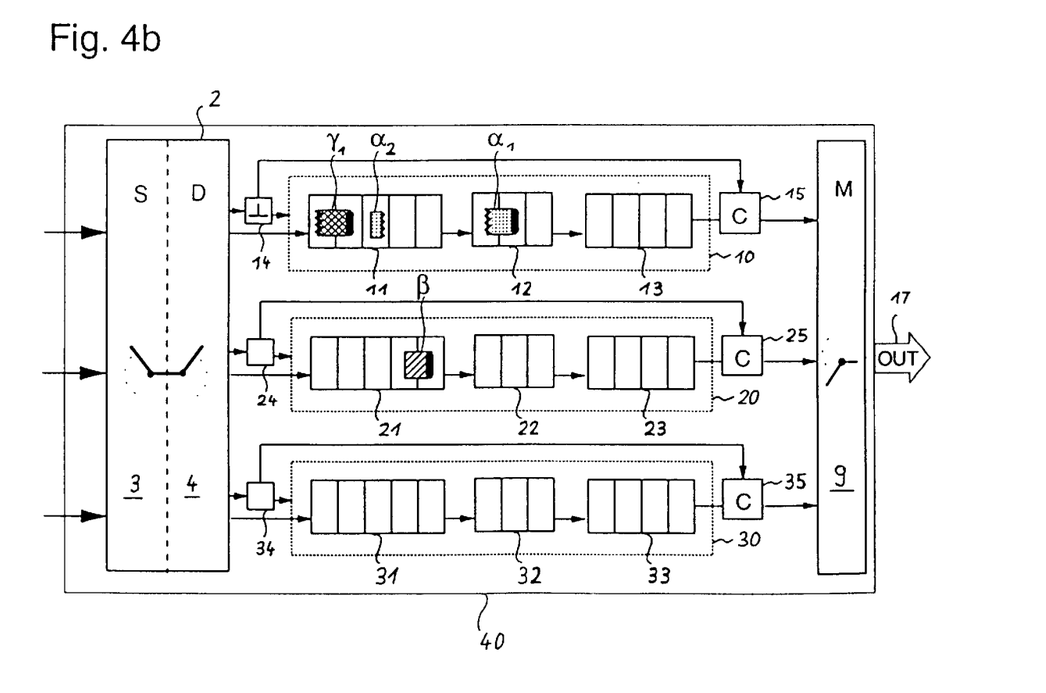
FIG. 4b is a third schematic snapshot according to FIG. 2b and 4b with packets and packet-parts in two different paths.

FIG. 4b shows a third snapshot, which is taken at the moment $t_3$ of the packet-processing apparatus 40 according to the FIGS. 2b and 3b. The first leading-packet-part $α_1$ is in process in the first main-processing unit 12 and the second packet β is in process in the second pre-processing unit 21. But in the meantime the fourth packet δ was received, shown in FIG. 4a. Therefore the third packet γ has been divided into the third leading-packet-part $γ_1$ and the third trailing-packet-part $γ_2$, whereby the third leading-packet-part $γ_1$ remains in the first queue 5, shown in FIG. 4a, and the third leading-packet-part $γ_1$ is in process in the first pre-processing unit 11. Also in the first pre-processing unit 11 is processed the first trailing-packet-part $α_2$. That is only possible because one processable or in other words amendable part of a packet, herein a part of the third leading-packet-part $γ_1$, is in the same first pre-processing unit 11. The first trailing-packet-part $α_2$ contains payload without a header which is processed in that it is only shifted and not amended, whereby the first pre-processing unit 11 is also able to process another's packet header, like the header of the third leading-packet-part $γ_1$. Merely the header of a packet or the frame checksum, also abbreviated to FCS, at the trailing-part of an IP-packet will be processed. The frame checksum at the end of the IP-packet is only processed in a checksum unit. That means in particular if a frame checksum at the end of an IP-packet is in process in a checksum unit, no other or following packet, which usually starts with a header, is allowed to be in this checksum unit during processing. Since the fourth packet δ is received, the third packet γ is interrupted while the first signalizer 14 signalizes that and creates information data which here is given to the first processing path 10 and thereby to the first processing units 11, 12, 13 and to the first collector 15 at the end of the first processing path 10.

Figure 5:
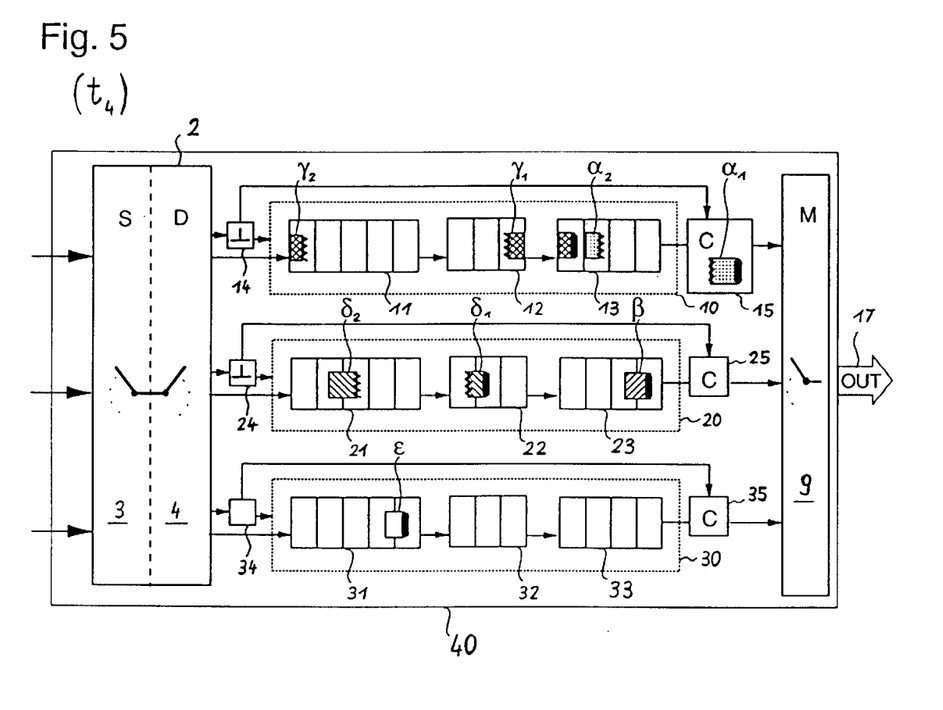
FIG. 5 is a fourth schematic snapshot according to the FIGS. 2b, 3b and 4b with packets and packet-parts in all processing paths.

FIG. 5 shows a further snapshot, which is taken at a moment $t_4$ of the packet-processing apparatus 40 according to the FIGS. 2b, 3b and 4b. The variable-length packets α, β, γ, δ, ε are in the packet-processing apparatus 40, whereby each processing path 10, 20, 30 is being used. The first leading-packet-part $α_1$ arrived at the first collector 15. The first collector 15, which comprises a buffer, collects the packet-parts $α_1$, $α_2$; $γ_1$, $γ_2$, whereby the first collector 15 waits for the first trailing-packet-part $α_2$ in order to reassemble the first packet-parts $α_1$, $α_2$ to the first packet α again and to send it to the multiplexer 9 for multiplexing which is described below. The first trailing-packet-part $α_2$ is in the first post-processing unit 13 together with the third leading-packet-part $γ_1$ which extends into the first main-processing unit 12, followed by the third trailing-packet-part $γ_2$ at the start of the first pre-processing unit 11. In the second processing path 20, the second packet β is in process in the second post-processing unit 23 followed by a fourth leading-packet-part $δ_1$ in the second main-processing unit 22 and a fourth trailing-packet-part $δ_2$ in the second pre-processing unit 21. Because of the division of the fourth packet δ, the second signalizer 24 has created the information data for the second processing path 20, which means the created information data is given to the second processing units 21, 22, 23 and the second collector 25 within the second processing path 20. The high-priority packet ε is being processed in the third pre-processing unit 31 within the third processing path 30.

At the end of the N processing paths 10, 20, 30 and behind the collectors 15, 25, 35, the packets α, β, γ, δ, ε can be multiplexed to the one single output stream 17. Multiplexing of interrupted or long packets α, γ, δ without collecting and reassembling of the packet-parts $α_1$, $α_2$; $γ_1$, $γ_2$; $δ_1$, $δ_2$ is also possible if an additional header, also referred to as switch-routing-header, belongs to these packet-parts $α_1$, $α_2$; $γ_1$, $γ_2$; $δ_1$, $δ_2$. Then, the switch-routing-header is added to all disconnected packet-parts $α_1$, $α_2$; $γ_1$, $γ_2$; $δ_1$, $δ_2$. This is possible since the processing paths 10, 20 for the long packets α, γ, δ are reserved for these and a header information was calculated from the first part of the long packet α, γ, δ. In this case, no collectors 15, 25, 35 before the multiplexer 9 will be necessary. The corresponding unit which otherwise adds this header to a single packet would then repeat this process for all following parts of the packet whenever the 'interrupt' information changes from '0' to '1'. However, this can require that a further information might be added between the switch-routing-header and the packet. This 'interrupt' information will not be read by the switch itself, but by the switch adapter at the other end of the switch. This switch adapter will then reassemble the packet before transmitting it to a physical line. Another possibility is to multiplex such interrupted packets again, but put them into reserved queues for the switch. An adapter can offer several input queues to the switch each for a specific priority.

Figure 6:
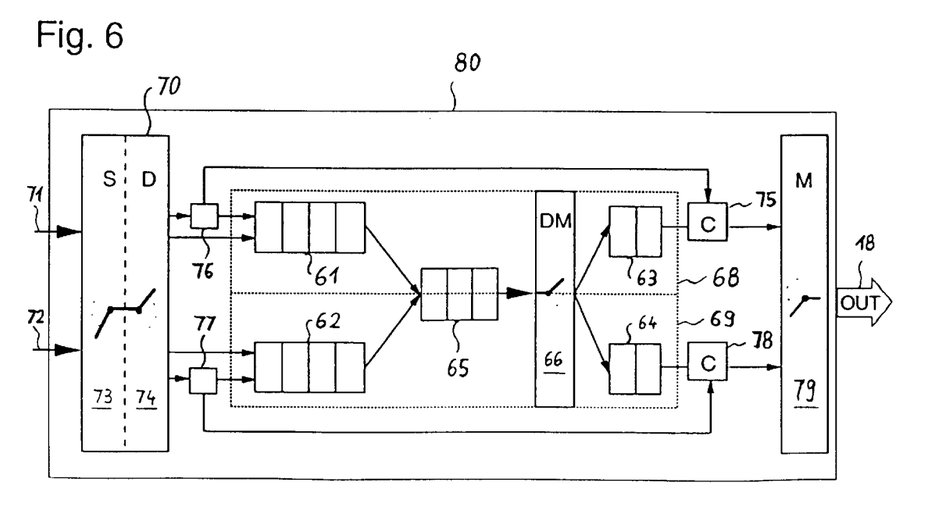
FIG. 6 is a schematic illustration of a further embodiment of the present invention, this embodiment comprising a parallel packet-processing apparatus with two parallel processing paths, one processing unit being used by both processing paths.

A further embodiment of the present invention is shown in FIG. 6. A parallel packet-processing apparatus 80 is provided which comprises a choosing unit 70 with a selector 73 and a distributor 74 followed by two parallel processing paths 68, 69, a first processing path 68 and a second processing path 69. The choosing unit is connected to a first pre-processing unit 61 within processing path 68 and to a second pre-processing unit 62 within processing path 69 which precede a joint-processing unit 65. That means in detail that the two outputs of the pre-processing units 61, 62 are connected to the one input of the joint-processing unit 65. The output side of the non-cycle-critical joint-processing unit 65 is connected to a demultiplexer 66 for feeding the packets to a first post-processing unit 63 or to a second post-processing unit 64. The one joint-processing unit 65 is used by both processing paths 68, 69. The necessary chip area thereby is significantly reduced. In general, processing units may be shared by all processing paths, or some parallel processing paths. Non-cycle-critical units are best suited for this purpose. In FIG. 6, a first queue 71 and a second queue 72 are connected to the choosing unit 70 at its input side, where the selected packets arrive according to the above described embodiment. At the end of the first processing path 68 is arranged a first collector 75 and at the end of the second processing path 69 is arranged a second collector 78. The first collector 75 and the second collector 78 are connected to a multiplexer 79 which is able to multiplex the processed packets into one output stream 18. In this embodiment, the non-cycle-critical joint-processing unit 65 is shared by the two parallel processing paths 68 and 69, i.e. the packets at the output side of the first pre-processing unit 61 and the second pre-processing unit 62 are all fed and processed through one and the same non-cycle-critical joint-processing unit 65. This is possible since packets from the different processing paths 68, 69 arrive in a staggered manner, i.e. not at the same time. The identification of joint-processing units 65 which can be used by several parallel processing paths 68, 69 may be done by the chip designer, or can be done automatically in synthesis optimization steps either in high-level synthesis, or in gate-level synthesis.

Part of the bandwidth of a packet-processing system may be dedicated to a particular application. This is an advantageous feature of a packet-based system and is used in networks for transmission of time-critical or real-time information. However, if such time-critical services are supported on a network, all adapters, switches and so on have to support this kind of service. I.e., it is to be ensured that the slots allocated to the application remain unchanged. This is ensured by the parallel-processing apparatus according to the present invention.

Figure 7:
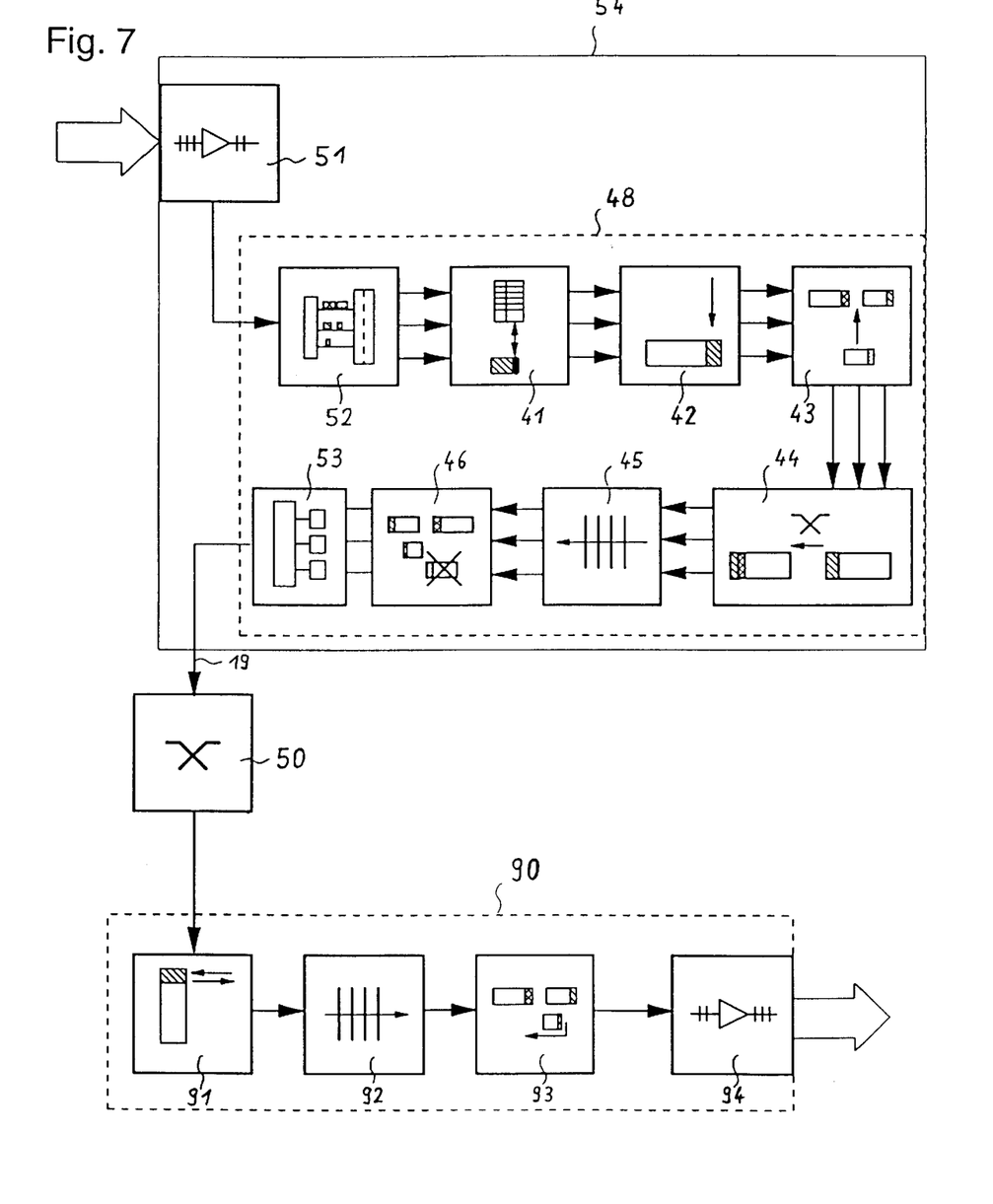
FIG. 7 is a schematic illustration of a packet-processing switching unit comprising an adapter card according to the present invention.

FIG. 7 shows a schematic illustration of a packet-processing switching unit comprising a packet switch adapter 54, also referred to as adapter card, according to the present invention. A schematic embodiment of the present invention, designed to be employed as part of the variable-length packet switch adapter 54 for coupling a variable-length packet data transmission channel to a vendor-specific packet-switching fabric 50, herein referred to as switch 50, is illustrated in FIG. 7. Such a variable-length packet switch adapter 54 is employed to transform an input stream of variable-length packets into a stream 19 of packets being suited for routing through the switch 50 requiring specially prepared packets. The structure and content of these specially prepared packets depends on the kind of switch used and varies from vendor to vendor. As schematically indicated, such a variable-length packet switch adapter 54 comprises many units, e.g. as well as delay units, some of the units being part of the above described parallel packet-processing apparatus 48. In the variable-length packet switch adapter 54, those units not being fast enough are carried out in parallel. Some of the other units, however, are just needed once. In particular those processing units which need more than one slot duration for processing of a packet are provided several times to allow parallel processing and arranged between a distributor and multiplexer. The fact that there are some process steps carried out in a parallel, staggered fashion is indicated in FIG. 7 by the parallel packet-processing apparatus 48 comprising the functional elements of FIG. 2b, for sake of simplicity. After having been processed by the variable-length packet switch adapter 54, the output packet stream 19 is then routed through the switch 50 at the output side of which another variable-length packet switch adapter 90, also referred to as adapter card 90, may be situated. This variable-length packet switch adapter card 90 may be employed to transform the stream of packets back into a variable-length packet stream.

As illustrated in FIG. 7, the arrangement of packet-processing units in the data path to the variable-length packet switch 50 and further to the other side of the switch 50 is highly sequential and it contains one branching point where the packets are forwarded to the switch 50. It is therefore ideally suited for on-the-fly packet-processing. A standard arrangement is shown in FIG. 7. A first unit is a receptor 51, also called a line interface handler 51 for receiving variable-length packets, which arbitrates the reception of variable-length packets from several first-in-first-out units, also abbreviated to FIFOs. Then follows an input unit 52 where the incoming packets are sorted according to their priority into priority queues by a sorter and selected and distributed for the following processing paths by a selector and a distributor respectively, as described in detail in the embodiment above. A signalizer, which for the sake of clarity is not depicted, creates information data and signalizes that a packet has been interrupted, which is described in detail also in the embodiment above. The next unit is a connection-label-lookup unit 41 which compares a field of a packet with fields of a predefined lookup table. These fields may contain addresses or special values. If a match occurs, then the corresponding content from the lookup table is added in form of one or several bits to the packet which tells further units what to do with this particular packet. A further unit in the connected row is a header-error-correction unit 42 which analyses the packet header for bit-errors and corrects occurring errors or marks packets with uncorrectable errors for removal. An operation-, administration- and maintenance-packet-processing unit 43, hereinafter abbreviated to OAM, inserts or extracts additional packets or packet-parts into or out of the packet stream for checking links and/or network-states. Such an OAM unit is used in switches for ATM cells, but it can be use- and helpful for packet-processing in general. A switch-routing header-insertion unit 44 adds to the variable-length packet a switch-specific header which tells the switch 50 to which output port or ports to forward the packet. A first packet-accounting unit 45 in the packet switch adapter 54 and a second packet-accounting unit 92 in the switch adapter card 90 behind the switch 50 count the number of packets forwarded for a connection, the number of possible invalid packets and so forth. A packet-policing unit 46 at a User Network Interface, also abbreviated to UNI, checks if the packet peak rate and medium rate conform to the permissions granted for a connection and may remove violating packets. A multiplexing unit 53 with a multiplexer and at least one collector collects, reassembles and multiplexes the packets to one output stream 19, which is fed to the input of the switch 50. The multiplexing can also be done after the switch 50. The output side of the switch 50 is connected to the switch adapter card 90 and as first to a header-update unit 91 which removes the switch-routing-header and replaces the old value by the corresponding value for the next link. The second packet-accounting unit 92, which is connected to the header-update unit 91, counts the number of packets forwarded for a connection and the number of possible invalid packets. A following traffic-shaping unit 93 delays packets inside the network until they conform with the permissions again, i.e. it corrects violations of traffic permissions which are caused by the network and not the user. As on the input side, there is a line interface handler 94 on the output side for arbitrating and adapting of an output packet stream to further packet-processing. All these units take a certain number of clock cycles for operation and some of them may need several parallel units to perform this in time. Also some of the units can be subdivided into further part-units.

What is claimed is:

1. A packet processing apparatus for processing an input packet stream of received variable-length packets which comprise packet data and packet information, said packet processing apparatus comprising a distributor for distributing said packets to several parallel, identical processing paths, wherein each processing path contains at least one processing unit into which said packets or packet parts are fed, said processing unit being able to process only one of said packets and the information contained in said one packet or said packet part at any moment in time, and in the event that said processing unit is occupied processing a packet at the time a subsequent packet arrives at said distributing unit, said packet is fed to another of said processing paths;

or said feeding is interruptable whereby several said packet parts are formed, and fed to another of said processing paths or said several packet parts of one said interrupted packet are processed in the same processing path; and a collector for collecting said several packet-parts and for reassembling thereof, wherein said collector has a buffer for said packet-parts;

wherein for each interrupted packet, information data is created, signaling that said packet has been interrupted;

said processing in said processing unit being operated with a predetermined clock, and a time period between two subsequently processed packets is an integer multiple of its clock duration.

2. The apparatus according to claim 1 comprising a sorter for sorting the received packets according to their priority, into priority queues.

3. The apparatus according to claim 2, comprising a selector for choosing packets from the priority queues.

4. A packet switch adapter for the processing of variable-length packets comprising packet data and packet information, said packets being receivable as a sequential input packet stream, said adapter comprising:

a distributor for distributing said packets to several parallel, identical processing paths, each said identical processing path containing at least one processing unit into which said packets or packet parts are fed said processing unit being able to process only one of said packets and the information contained in said one packet or said packet part at any moment in time, and in the event that said processing unit is occupied processing a packet at the time a subsequent packet arrives at said distributing unit, said packet is fed to another of said processing paths;

said feeding is interruptable whereby several said packet parts are formed, and fed to another of said processing paths, and a signalizer for signaling that said packet has been interrupted into several packet-parts, whereby for each resulting interrupted packet information data is created, signaling that said packet has been interrupted, and a collector for each said processing path which collects said several packet-parts and reassembles said several packet-parts, a connection-label-lookup unit employable to compare a field of the packet with fields of a predefined lookup table and in the case of match, the corresponding content from said lookup table is added to said packet in order to inform a further unit what to do with said packet, a header-error-correction unit for analyzing a packet header of the packets for one or more bit-errors and/or correcting this;

an operation-administration- and maintenance-packet-processing unit for extracting from and/or inserting into the stream of packets at least one additional packet;

a packet accounting unit for counting the number of packets forwarded to a connection and/or the number of invalid packets;

a packet policing unit for controlling a packet peak rate and/or medium rate;

a switch routing header insertion unit for adding to each packet a switch-specific header which tells a switch where to forward the respective packet, an operation-, administration- and maintenance-packet-processing unit for extractng from, and/or inserting into the stream of packets, at least one additional packet, a packet accounting unit for counting the number of packets forwarded to a connection and/iothe number of occurring invalid packets, a packet policing unit for controlling a packet peak rate and/or medium rate.

5. A packet switching unit comprising a packet switch adapter for the processing of variable-length packets comprising packet data and packet information, said packets being receivable as a sequential input packet stream, said adapter comprising:

a distributor for distributing said packets to several parallel, identical processing paths, each said identical processing path containing at least one processing unit into which said packets or packet parts are fed said processing unit being able to process only one of said packets and the information contained in said one packet or said packet part at any moment in time, and in the event that said processing unit is occupied processing a packet at the time a subsequent packet arrives at said distributing unit, said packet is fed to another of said processing paths;

said feeding is interruptable whereby several said packet parts are formed, and fed to another of said processing paths, and a signalizer for signaling that said packet has been interrupted into several packet-parts, whereby for each resulting interrupted packet information data is created, signaling that said packet has been interrupted, a collector for each said processing path which collects said several packet-parts and reassembles said several packet-parts, a connection-label-lookup unit employable to compare a field of the packet with fields of a predefined lookup table and in the case of match, the corresponding content from said lookup table is added to said packet in order to inform a further unit what to do with said packet, a header-error-correction unit for analyzing a packet header of the packets for one or more bit-errors and/or correcting this;

an operation-administration- and maintenance-packet-processing unit for extracting from and/or inserting into the stream of packets at least one additional packet;

a packet accounting unit for counting the number of packets forwarded to a connection and/or the number of invalid packets;

a packet policing unit for controlling a packet peak rate and/or medium rate;

a switch routing header insertion unit for adding to each packet a switch-specific header which tells a switch where to forward the respective packet, an operation-, administration- and maintenance-packet-processing unit for extracting from, and/or inserting into the stream of packets, at least one additional packet, a packet accounting unit for counting the number of packets forwarded to a connection and/or the number of occurring invalid packets, a packet policing unit for controlling a packet peak rate and/or medium rate;

a switch-routing-header-insertion unit for adding to each packet a switch-specific header which tells a switch to what location to forward said respective packet, said packet-switching unit comprising:

a header-update unit for removing and/or replacing the switch-specific header;

a packet-accounting unit for counting the number of packets forwarded for a connection and/or the number of occurring invalid packets;

a traffic-shaping unit for correcting deviations of traffic permissions, and a line-interface handler for arbitration of the packets for further packet processing, being located at an output port or output ports of said switch.

* * * * *